(12) United States Patent
Jones et al.

(10) Patent No.: US 10,046,463 B1
(45) Date of Patent: Aug. 14, 2018

(54) PASSIVE MECHANICAL SYSTEM FOR DOCKING AND PAYLOAD TRANSFER FOR UNMANNED UNDERWATER VEHICLES

(71) Applicant: The United States of America as represented by the Secretary of the Navy, Washington, DC (US)

(72) Inventors: Anthony D. Jones, San Diego, CA (US); Wayne P. Liu, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/903,140

(22) Filed: Feb. 23, 2018

(51) Int. Cl.
*B25J 15/00* (2006.01)
*B63G 8/00* (2006.01)

(52) U.S. Cl.
CPC .......... *B25J 15/0028* (2013.01); *B63G 8/001* (2013.01); *B63G 2008/002* (2013.01)

(58) Field of Classification Search
CPC .... B25J 15/0028; B25J 15/0206; B63G 8/001
USPC ... 294/106, 24, 26, 203, 210, 192, 194, 198, 294/102.2
See application file for complete search history.

(56) References Cited

U.S. PATENT DOCUMENTS

| | | | | |
|---|---|---|---|---|
| 2,757,038 A * | 7/1956 | Drill | ...................... | B66C 1/425 294/106 |
| 3,306,646 A * | 2/1967 | Flora, Jr. | ................. | B66C 1/427 294/106 |
| 3,451,711 A * | 6/1969 | Carpenter | ............... | B66C 1/422 294/106 |
| 3,942,834 A * | 3/1976 | Kawaguchi | ............... | B66C 1/64 294/106 |
| 4,304,433 A * | 12/1981 | Langowski | ............. | E21B 19/14 294/106 |
| 4,368,913 A * | 1/1983 | Brockmann | ......... | B25J 15/0266 294/106 |
| 5,853,211 A * | 12/1998 | Sawdon | ............... | B25J 15/0226 294/116 |
| 6,530,616 B1 * | 3/2003 | McIntosh | ................ | B25B 5/087 294/106 |
| 8,141,924 B2 * | 3/2012 | Albin | ...................... | B66F 9/065 294/106 |
| 8,454,069 B2 * | 6/2013 | Jenkins | .................. | B25J 9/1005 294/115 |

* cited by examiner

*Primary Examiner* — Paul T Chin
(74) *Attorney, Agent, or Firm* — SPAWAR Systems Center Pacific; Kyle Eppele; Young Fei (57) ABSTRACT

A base member comprising a vertical fin member, a vertical fin stopper surface, a trigger arm recess, and a base guidance slot. A left jaw member comprising a left jaw portion, a left lever portion, a left guidance slot, a left fastening hole, and a trigger release screw. A right jaw member comprising a right jaw portion, a right lever portion, and a right guidance slot. A trigger arm member comprising a trigger hook and a curved trigger end. A top member comprising a top guidance slot, a left spring hole, a right spring hole, a left bottom recess, a right bottom recess, a left spring recess, and a right spring recess. A left spring tension screw received through the left spring hole and a left spring spacer retained in the left spring recess. A bumper member with a bumper surface, a left elongated member, and a right elongated member.

20 Claims, 14 Drawing Sheets

PASSIVE MECHANICAL SYSTEM FOR DOCKING AND PAYLOAD TRANSFER FOR UNMANNED UNDERWATER VEHICLES

FEDERALLY SPONSORED RESEARCH AND DEVELOPMENT

The Passive Mechanical System for Docking and Payload Transfer for Unmanned Underwater Vehicles is assigned to the United States Government and is available for licensing and commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case 108119.

BACKGROUND OF THE INVENTION

1. Field of the Invention

The present invention relates to clamping mechanisms, and particularly to a passive spring-loaded docking and payload transfer mechanism which uses a trigger bar to disconnect a sear, allowing a torsion or linear spring to drive the jaw closed.

2. Description of the Related Art

Unlike many existing undersea docking platforms that require precise and vehicle-specific docking within a close fitting structure, the present invention enables universal docking and payload exchange with diverse undersea platforms without the need to rely on costly and inflexible vehicle specific mechanisms. This purely mechanical invention has the advantage of simplicity. It requires no interaction with the vehicle's onboard electronics, and so may be used entirely as a mechanical application.

SUMMARY OF THE INVENTION

The present invention is a device for docking unmanned underwater vehicles. The device includes a base member having a vertical fin member with a vertical fin stopper surface and a trigger arm recess, a base guidance slot on the base. The invention also includes a left jaw member with a left jaw portion and a left lever portion, a left guidance slot on the left lever portion, a pivot connection connecting the left jaw member to the base member, a left fastening hole in the left jaw member, and a trigger release screw received in the left fastening hole. The invention additionally includes a right jaw member with a right jaw portion and a right lever portion, a right guidance slot in the right lever portion, and a pivot connection connecting the right jaw member to the base member. The present invention further includes a trigger arm member with a trigger hook and a curved trigger arm end, with the trigger hook connected to a trigger release screw, and a trigger arm actuation hole in the trigger arm. Additionally, the invention includes a top member with: a top guidance slot, a left spring hole, a right spring hole, a left bottom recess, a right bottom recess, a left spring recess, and a right spring recess. The invention includes a guide bolt received through the top guidance slot. Furthermore, a left spring tension screw is received through the left spring hole and a left spring spacer is retained in the left spring recess. The invention further includes a bumper member with a front bumper surface, a left elongated member slidably received in the left bottom recess, and a right elongated member. The bumper member has a rear bumper surface abutting the left spring, and the left elongated member abuts the trigger actuation screw.

An embodiment of the invention also includes a base member with the following features: a base spring recess, a left base fastening hole, and a right base fastening hole. The left jaw portion can also have a left locking projection, a left pivot hole, and a left spring slot. The right jaw portion may alternatively have a right locking projection, a right pivot hole, and a right spring slot. In one embodiment, the curved trigger arm end is received in the trigger arm recess. The intermediate member may also be connected pivotally to the left jaw member and connected pivotally to the right jaw member. In one embodiment, the top member has a left top fastening hole and a right top fastening hole. The guide bolt may be received through the intermediate guidance slot. The bumper member also may have a left bumper spring hole and a right bumper spring hole. In one embodiment, the right elongated member may be slidably received in the right bottom recess.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While this invention may be embodied in different forms, the drawings and this section describe in detail specific embodiments of the invention with the understanding that the present disclosure is to be considered merely a preferred embodiment of the invention, and is not intended to limit the invention in any way.

This invention allows an underwater vehicle to interface with external devices. This invention enables underwater vehicles to dock with other underwater vehicles and platforms using a universal clamping mechanism, eliminating the requirement for bespoke closely fitting structures tailored to each specific application. The present invention is a passive mechanical device which may be attached to an unmanned underwater vehicle or other underwater vehicle in a modular manner. The use of a purely mechanical and passive system eliminates the need to integrate the docking mechanism into the underwater vehicle's electronic and control systems, substantially simplifying the system.

During docking, the present invention may mate to any object which makes contact with the bumper member 800 and be grasped by the left jaw member 300 and the right jaw member 400. The left jaw member 300 and right jaw member 400 form a pair of spring-loaded jaws that open widely and serve as a guide for the underwater vehicle's final approach to its target. When the invention's bumper member 800 makes contact with the target spar, a trigger arm member 600 acts as a sear, releasing the left jaw member 300 and right jaw member 400, allowing the jaw members to spring closed and lock the two vehicles together. The bumper member 800 is adjustable for trigger weight using a left spring tension screw 711, a left spring spacer 712, and a left spring 713 (serving as bias springs), which allows the trigger weight to be tuned to ensure sufficient sensitivity to contact while maintaining adequate resistance against accidental activation. The invention may be practiced using a single spring or a pair of springs. An embodiment of the invention is described here with only a left spring 713.

The left jaw member 300 and right jaw member 400 may be synchronized using pinned slotted joints or through the use of mated gears. The left jaw member 300 and right jaw member 400 are intended to be modular and replaceable, allowing the invention to be tailored to the particular requirements of the application. As such, the left jaw member 300 and right jaw member 400 may be mounted to the remaining elements of the invention using a bolt patter or other means. While the embodiment of the invention described in this section uses pinned slots for jaw synchronization, the jaw members may be synchronized using other mechanisms.

Figure 1:
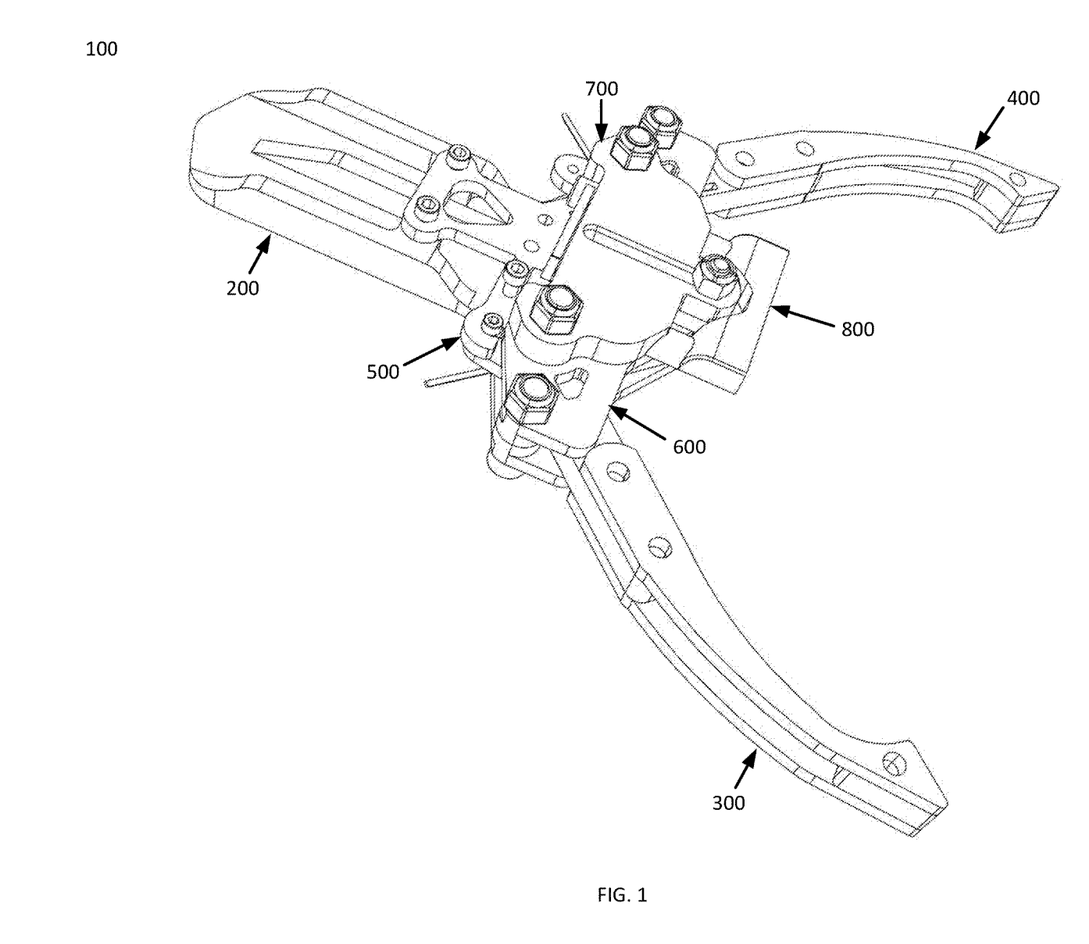
FIG. 1 shows a perspective view of the components of a Passive Mechanical System for Docking and Payload Transfer for Unmanned Underwater Vehicles.

FIG. 1 depicts the major elements of the present invention, a device for docking unmanned underwater vehicles 100. The device for docking unmanned underwater vehicles 100 comprises a base member 200 which may be attached to a left jaw member 300, a right jaw member 400. A trigger arm member 500 may be attached to the left arm member 300. An intermediate member 600 may be attached to the left jaw member 300 and the right jaw member 400. A bumper member 800 may be slidably received underneath the top member 700.

Figure 2:
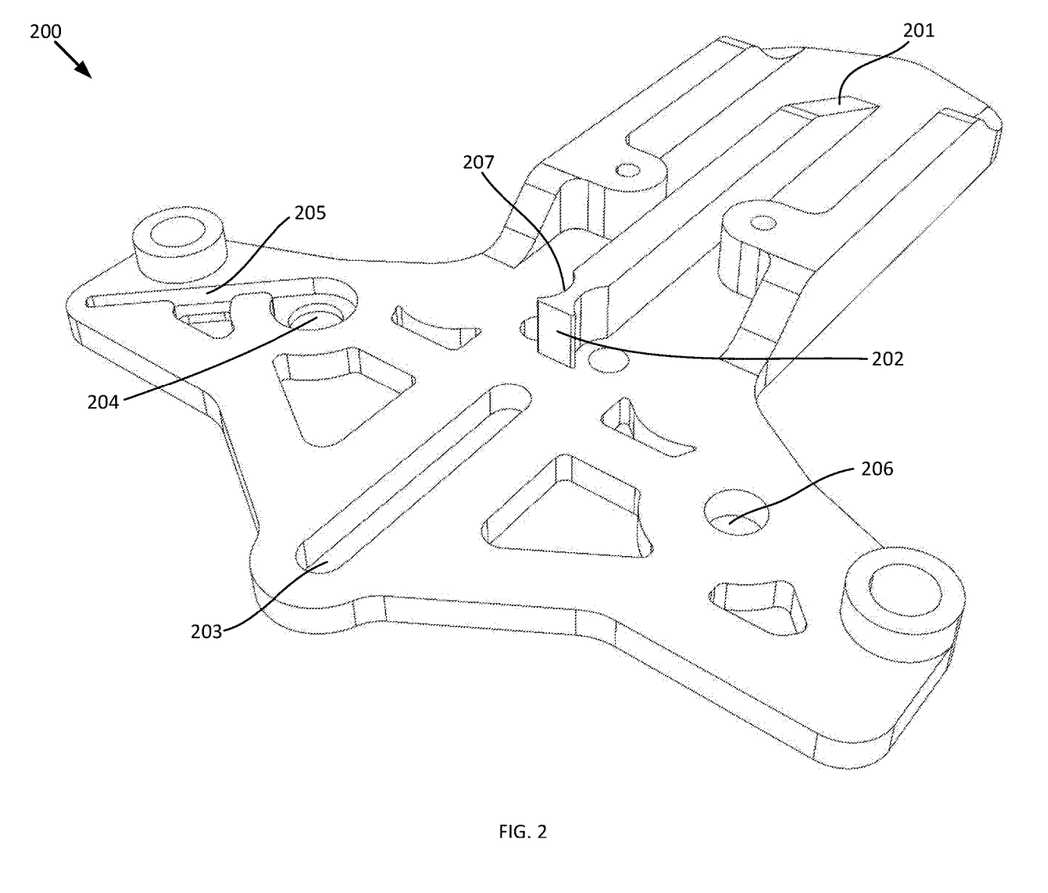
FIG. 2 is a perspective view of the base member according to the present invention.

FIG. 2 shows features of the base member 200 according to one embodiment of the invention. The base member 200 may have a vertical fin member 200 with a vertical fin stopper surface 202, a base guidance slot 203, a base spring recess 204, a left base fastening hole 205, a right base fastening hole 206, and a trigger arm recess 207.

Figure 3:
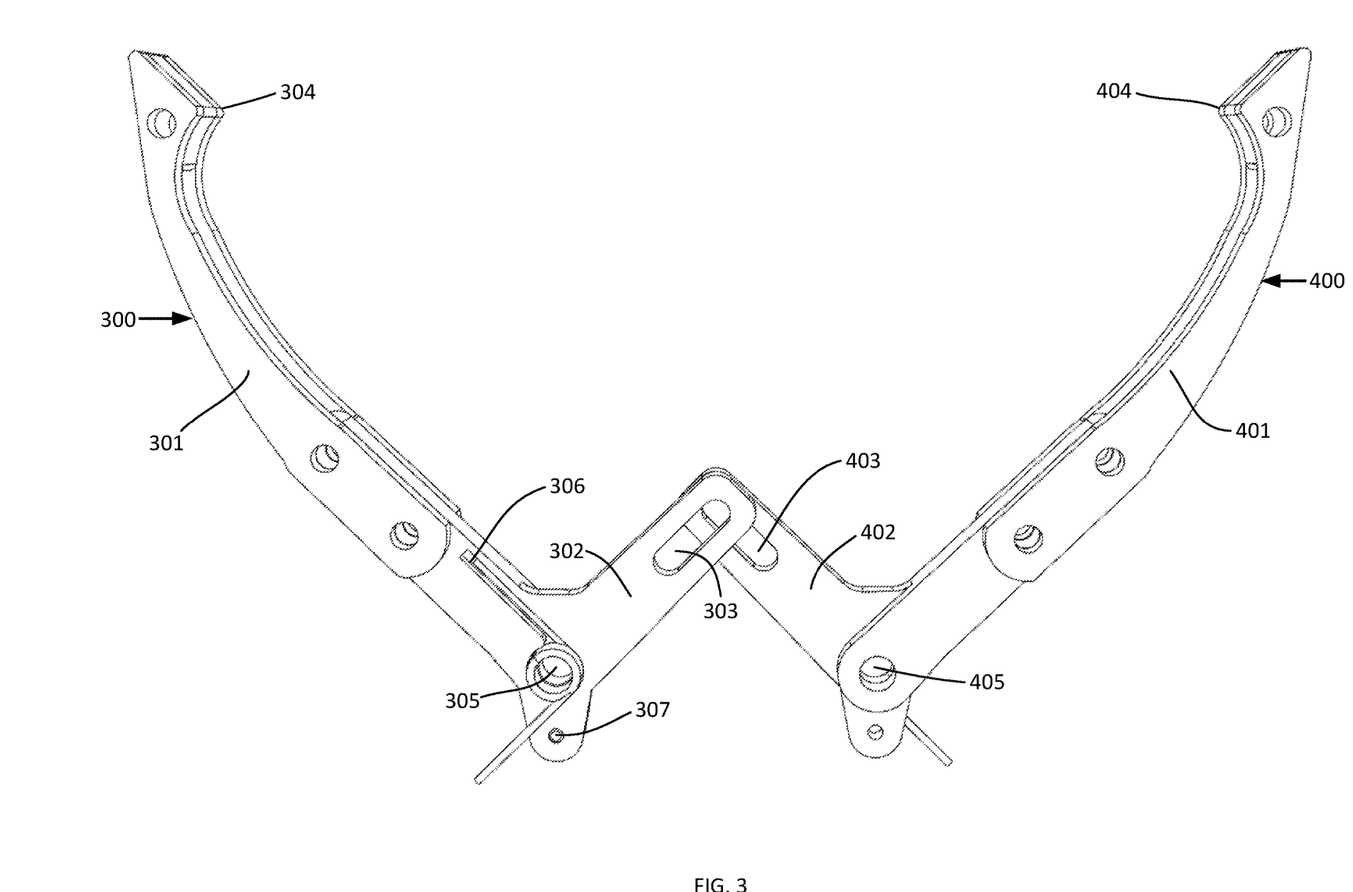
FIG. 3 is a perspective view of the left jaw member and the right jaw member according to the present invention.

FIG. 3 shows features of the left jaw member 300 and right jaw member 400. An embodiment of the left jaw member 300 could have a left jaw portion 301 and a left lever portion 302. The left lever portion 302 may have a left guidance slot 303. The left jaw portion 301 may have a left locking projection 304 to aid the underwater vehicle in grasping its target. The left jaw member 300 additionally may have a left pivot hole 305, a left spring slot 306, and a left fastening hole 307. An embodiment of the right jaw member 400 could have a right jaw portion 401 and a right lever portion 402. The right lever portion 402 may have a right guidance slot 403. The right jaw portion 401 may have a right locking projection 404 to aid the underwater vehicle in grasping its target. The left locking projection 304 and the right locking projection 404 may touch when the jaws are closed. The right jaw member 400 additionally may have a right pivot hole 405.

Figure 4:
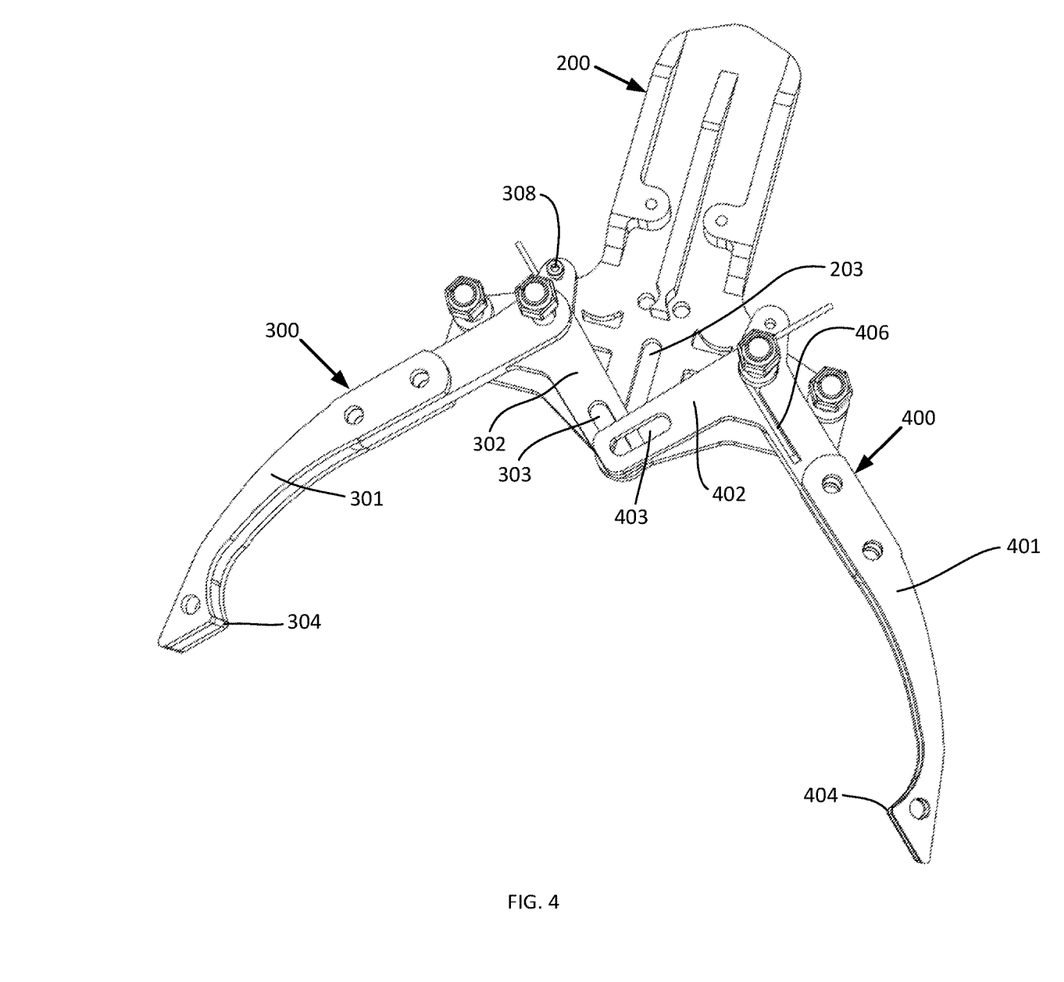
FIG. 4 is a perspective view of the left jaw member, the right jaw member, and the base member according to the present invention.

FIG. 4 shows additional details of the left jaw member 300 and right jaw member 400, as well as how these elements fit together with the base member 200. The left jaw member 300 additionally comprises a trigger release screw 308, and the right jaw member 400 comprises a right spring slot 406. The left guidance slot 303 of the left jaw member 300 overlaps with the right guidance slot 403 of the right jaw member 400 and the base guidance slot 203 of the base member 200 in such a way that a single bolt may be driven through the three elements, locking them together while allowing the bolt to slide along the length of the slots.

Figure 5:
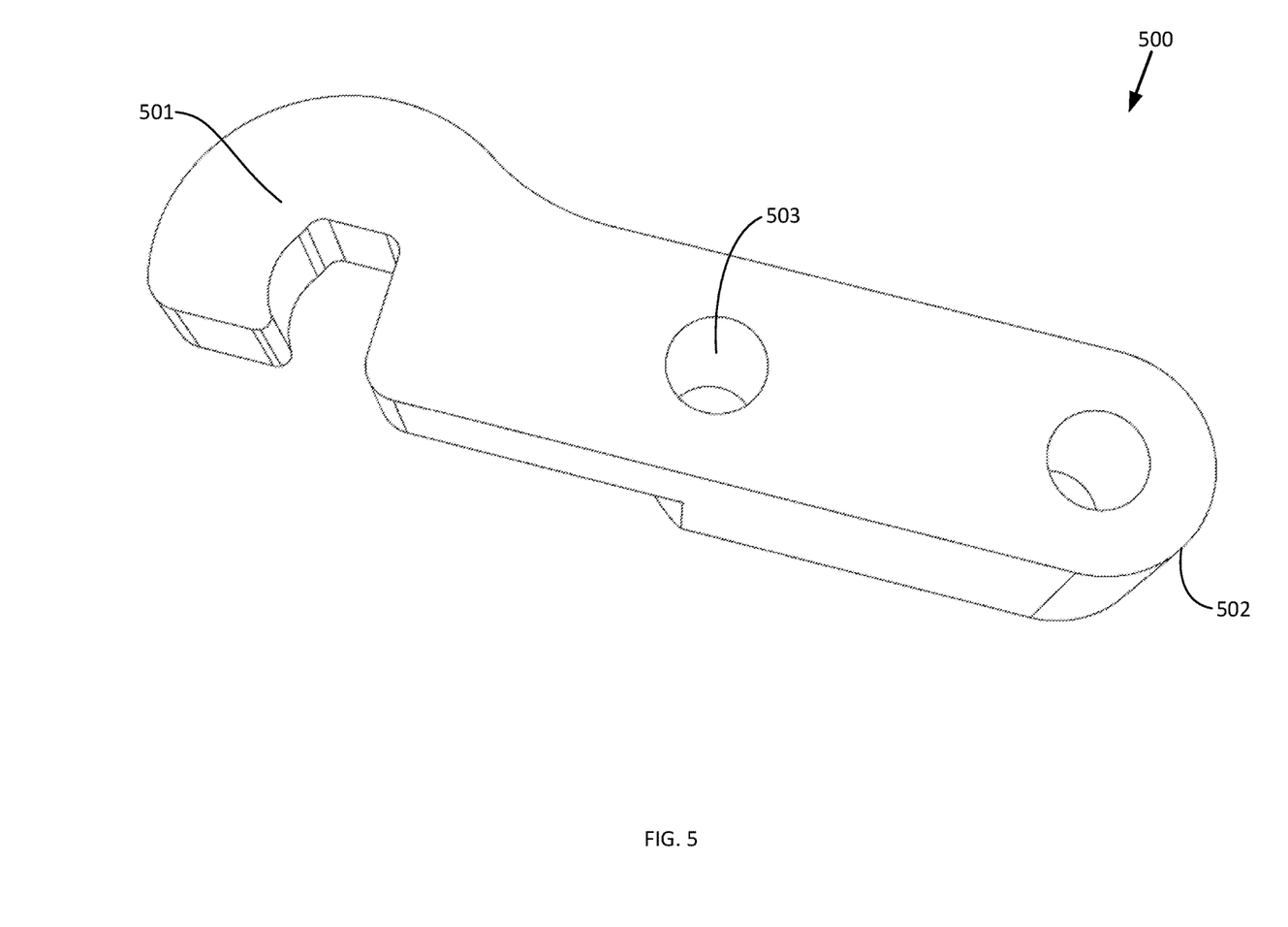
FIG. 5 is a perspective view of the trigger arm member according to the present invention.
Figure 6:
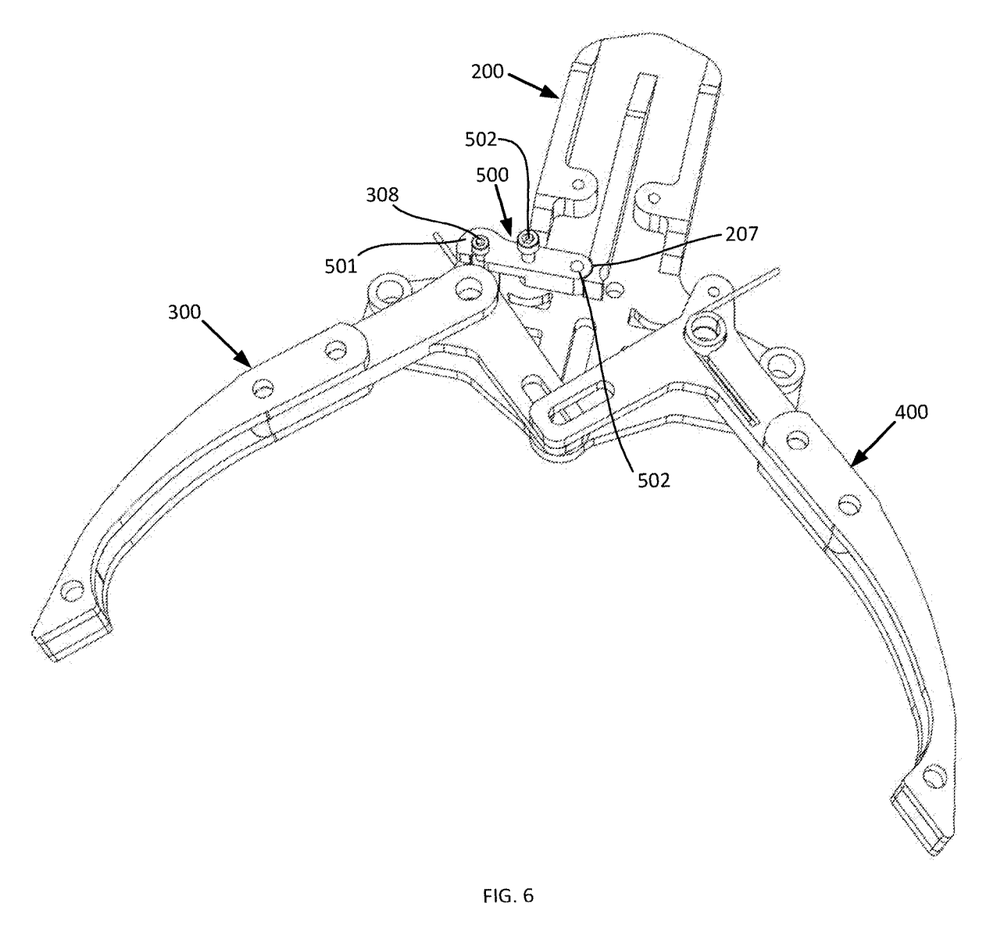
FIG. 6 is a perspective view of the trigger arm member, the left jaw member, the right jaw member, and the base member according to the present invention.

FIG. 5 shows an embodiment of the trigger arm member 500. The trigger arm member 500 comprises a trigger hook portion 501, a curved trigger arm end 502, and a trigger arm hole 503. FIG. 6 shows additional details of the trigger arm member 500, as well as how the trigger arm member 500 connects to the left jaw member 300 and locks into the base member 200. In one embodiment of the invention, the trigger hook portion 501 of the trigger arm member 500 is able to hook into the trigger release screw 308 of the left jaw member 300. The curved trigger arm end 502 fits into the trigger arm recess 207 of the base member 200 in such a way to allow the trigger arm member 500 to pivot.

Figure 7:
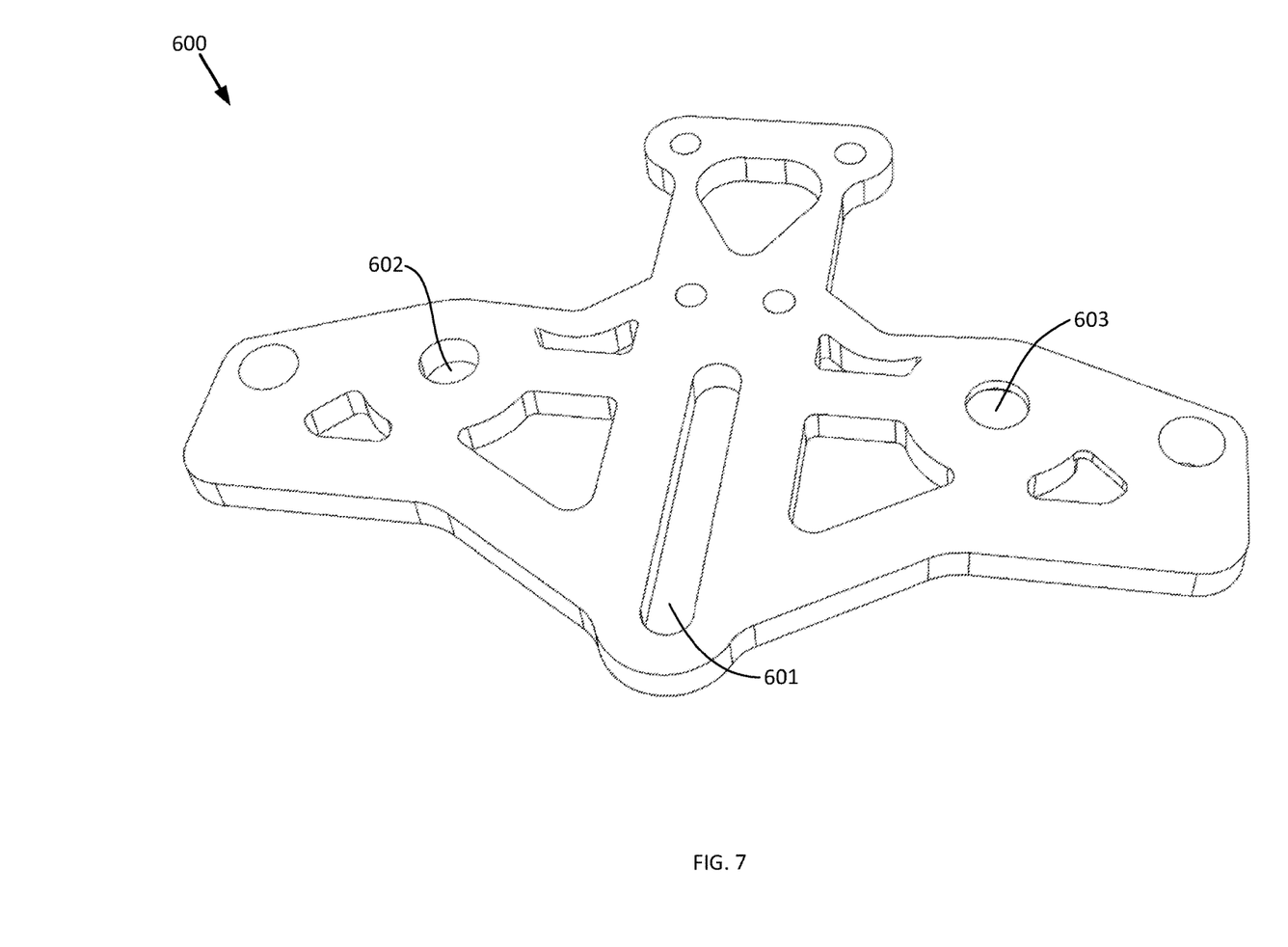
FIG. 7 is a perspective view of the intermediate member according to the present invention.

FIG. 7 shows an embodiment of the intermediate member 600. The intermediate member 600 comprises an intermediate guidance slot 601, a left intermediate fastening hole 602, and a right intermediate fastening hole 603.

Figure 8:
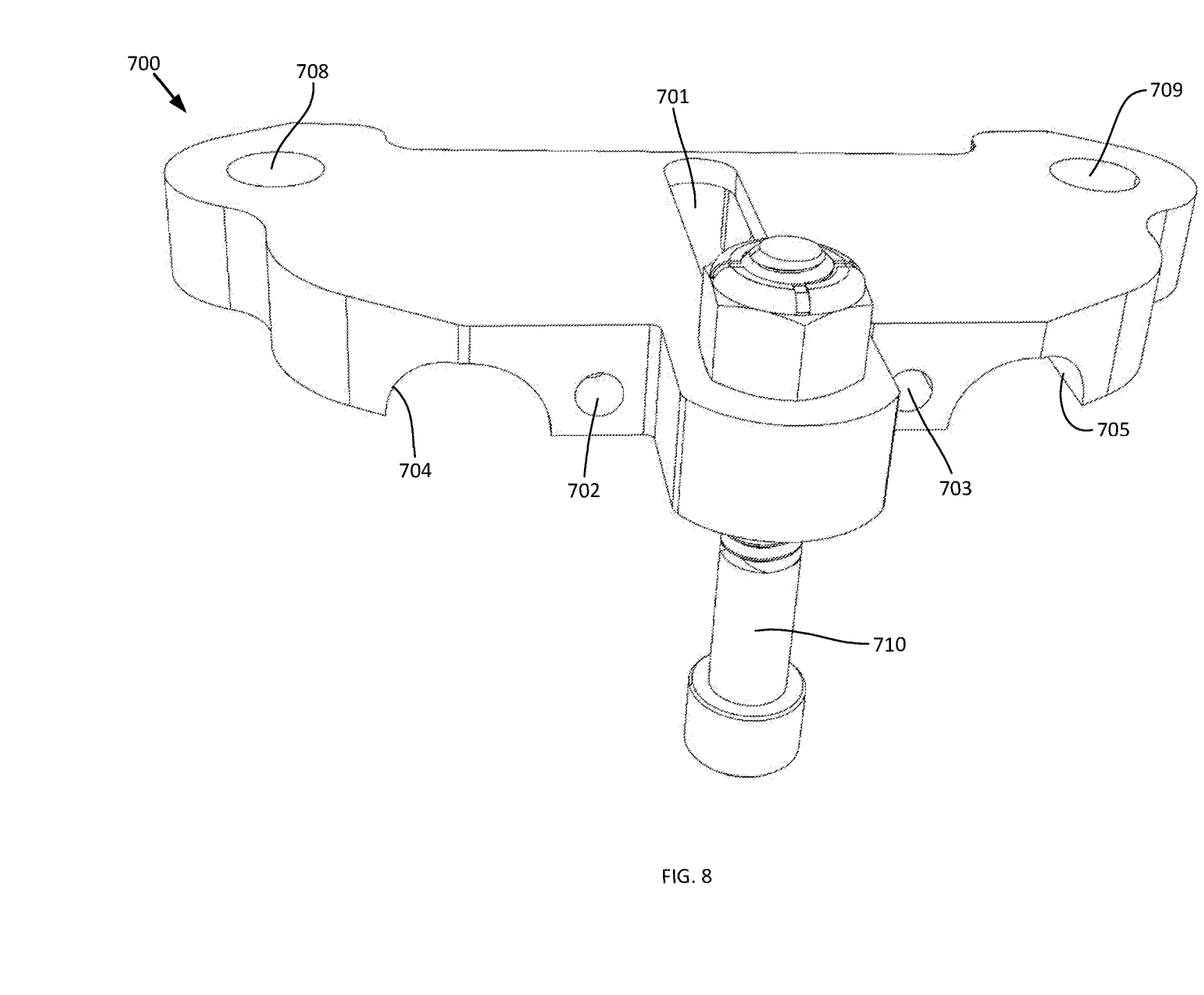
FIG. 8 is a top perspective view of the top member according to the present invention.
Figure 9:
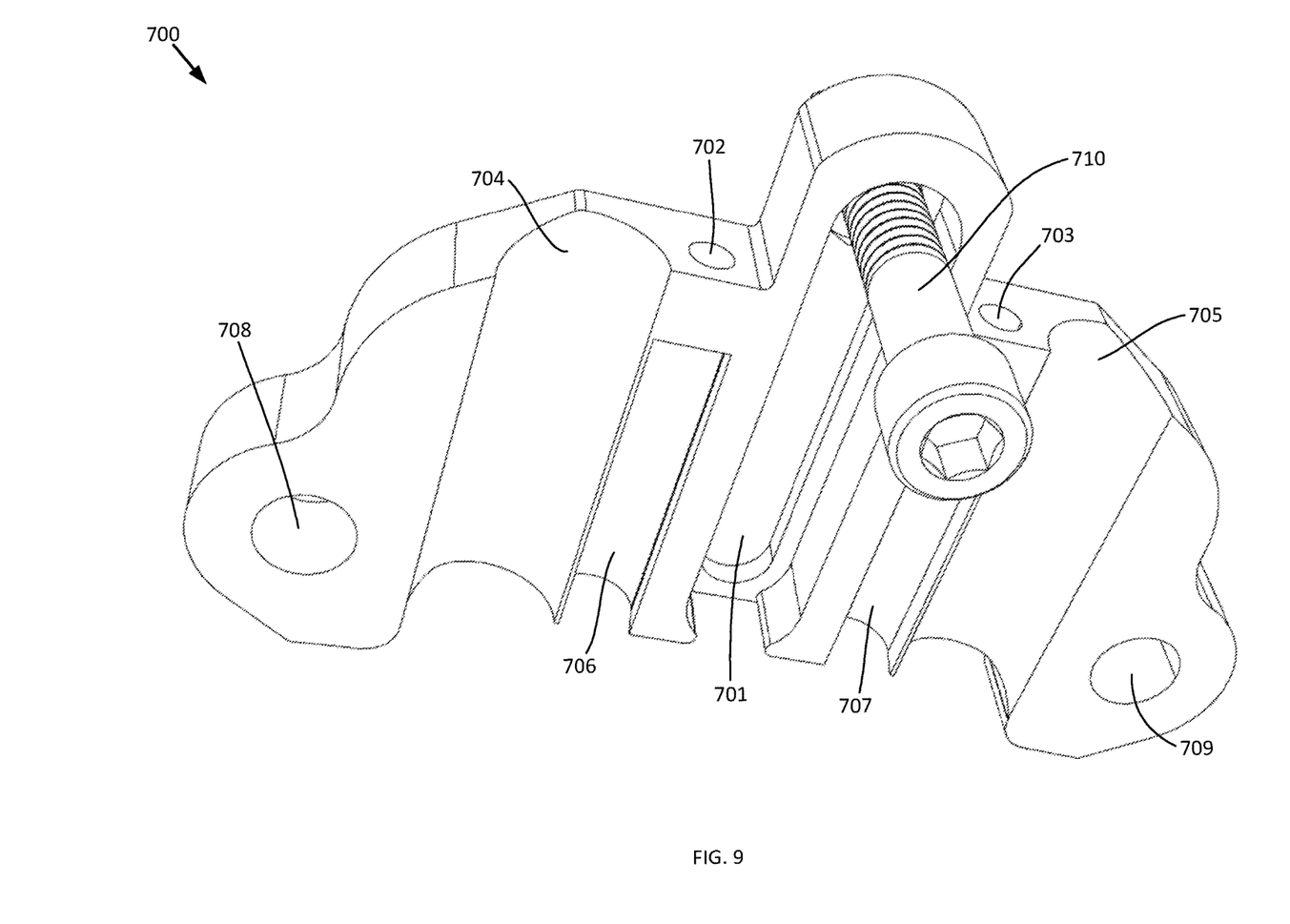
FIG. 9 is a bottom perspective view of the top member according to the present invention.
Figure 10:
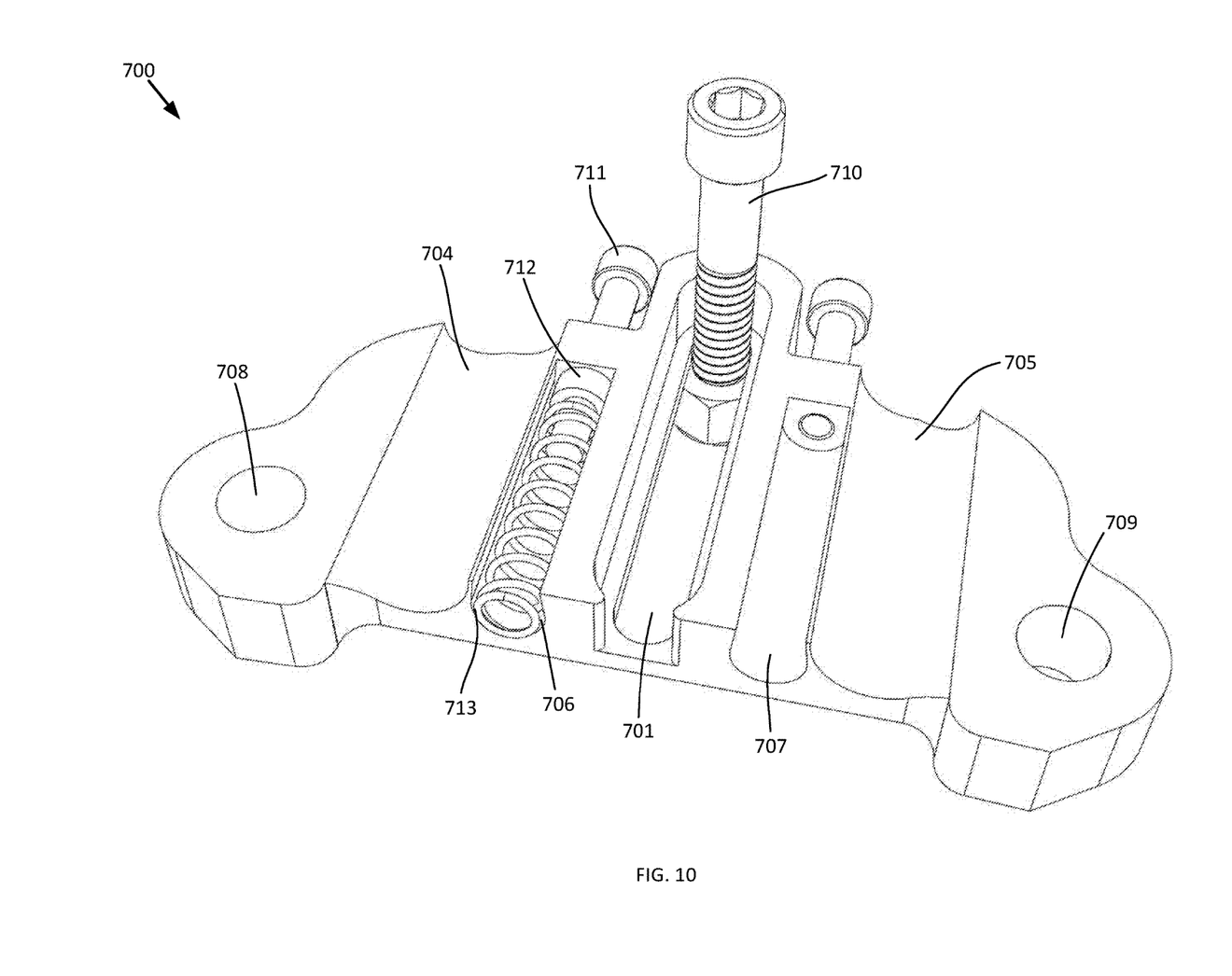
FIG. 10 is a bottom perspective view of the top member according to the present invention showing the left spring tension screw, the left spring spacer, and the left spring in greater detail.

FIG. 8 shows an embodiment of the top member 700. The top member 700 comprises a top guidance slot 701, a left spring hole 702, a right spring hole 703, a left bottom recess 704, a right bottom recess 705, a left top fastening hole 708, a right top fastening hole 709, and a guide bolt 710 running through the top guidance slot 701. FIG. 9 depicts the underside of the top member 700, showing additional details. The top member 700 additionally comprises a left bottom recess 704, a right bottom recess 705, a left spring recess 706, and a right spring recess 707. FIG. 10 depicts an embodiment of the invention where the left spring tension screw 711 fits into the left spring spacer 712, which sits between the left spring tension screw 711 and the left spring 713. The left spring 713 may be coiled around a portion of the left spring tension screw. The left spring tension screw fits through the left spring hole 702, and the left spring 713 sits inside of the left spring recess 706.

Figure 11:
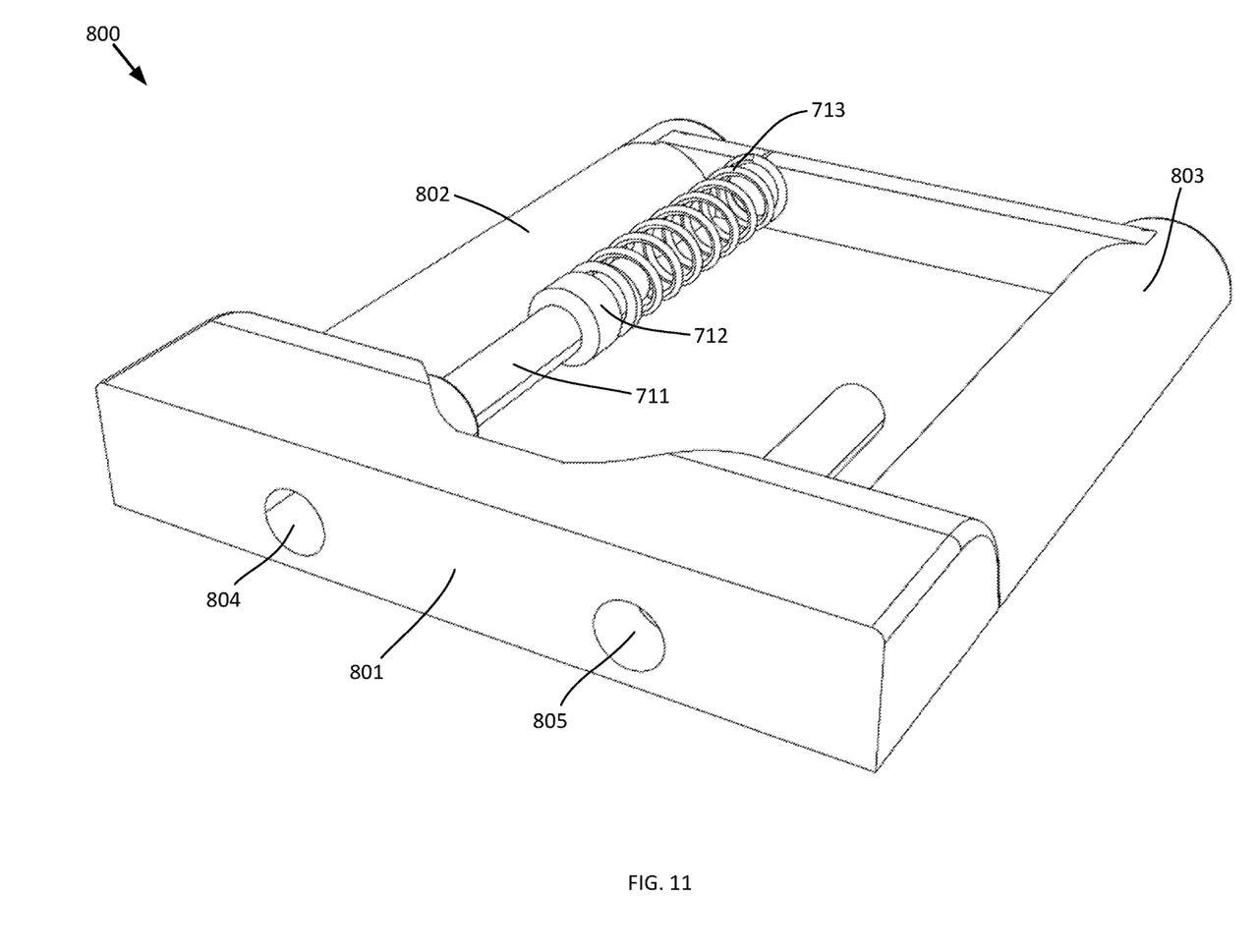
FIG. 11 is a perspective view of the bumper member according to the present invention.
Figure 12:
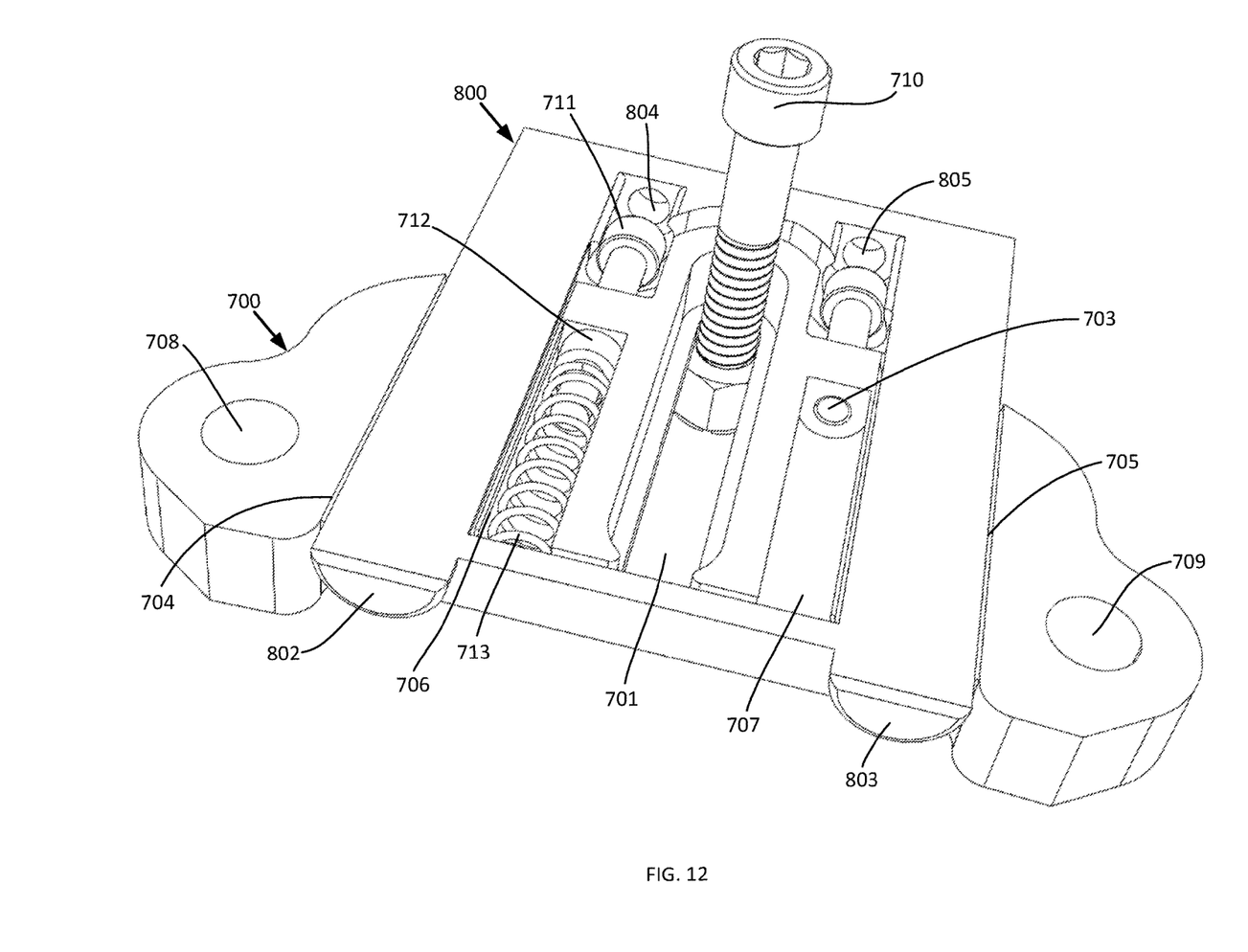
FIG. 12 is a perspective view showing the top member and the bumper member according to the present invention.

FIG. 11 shows how an embodiment of the bumper member 800. The bumper member 800 comprises a front bumper surface 801 which makes contact with the target. The bumper member 800 further comprises a left elongated member 802, a right elongated member 803, a left bumper spring hole 804, and a right bumper spring hole 805. The left spring 713 touches a portion of the bumper member 800, and the left spring spacer 712 touches the left spring 713 at the opposite end that the left spring 713 touches the bumper member 800. The left spring tension screw 711 runs through the left spring spacer 712 and a portion of the left spring 713. The left spring tension screw 711 may be adjusted through the left bumper spring hole 804. FIG. 12 depicts an embodiment of the invention where the left elongated member 802 of the bumper member 800 is slidably retained in the left bottom recess 704 of the top member 700, and the right elongated member 803 of the bumper member 800 is slidably retained in the right bottom recess 705 of the top member 700.

Figure 13:
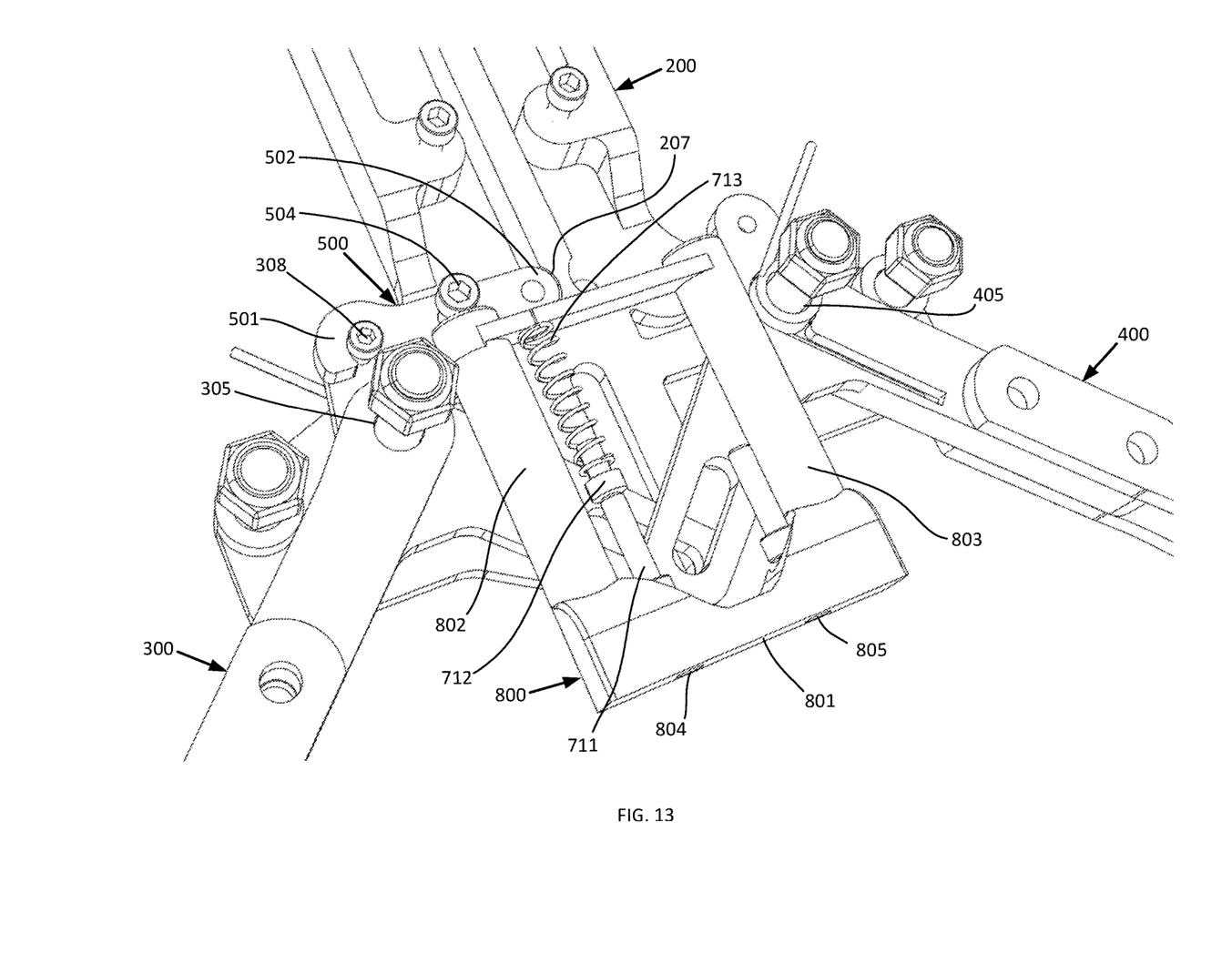
FIG. 13 is a perspective view showing the bumper member, the trigger arm member, the left jaw member, the right jaw member, the intermediate member, and the base member according to the present invention.
Figure 14:
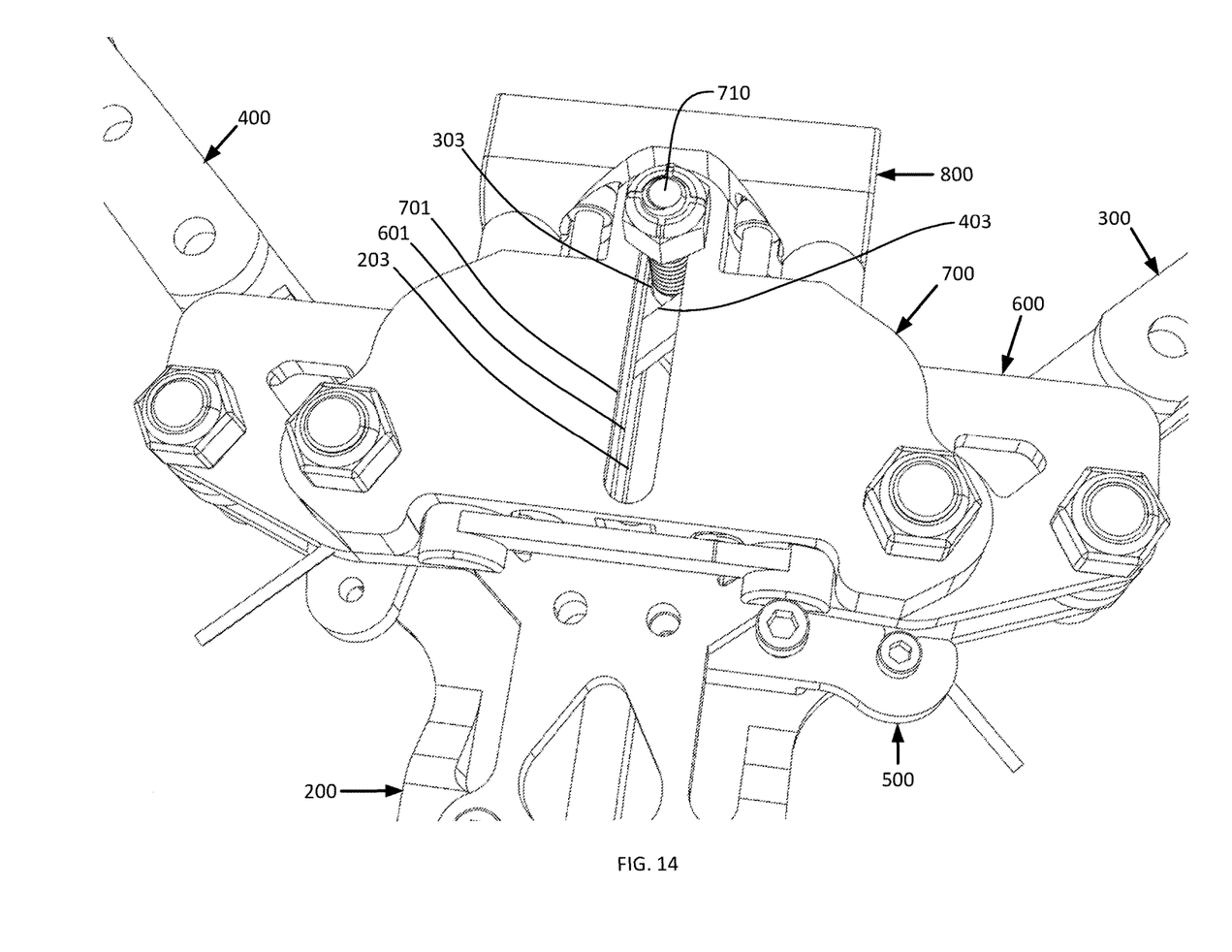
FIG. 14 is a perspective view depicting a way the guide bolt interacts with top member, the intermediate member, the left arm member, the right arm member, and the base member according to the present invention.

FIG. 13 depicts an embodiment of the invention whereby the left elongated member 802 of the bumper member 800 abuts the trigger actuation screw 504 of the trigger arm member. When the front bumper surface 801 of the front bumper member 800 is pushed by a target, the front bumper member 800 slides in a way that pushes the trigger actuation screw 504, causing the trigger arm member 500 to pivot about the curved trigger arm end 502 secured in the trigger arm recess 207 of the base member 200. This causes the trigger hook portion 501 of the trigger arm member 500 to no longer be secured to the trigger release screw 308 of the left jaw member 300, allowing the spring elements to drive the left jaw member 300 shut. FIG. 14 depicts the guide bolt 710 running through the left guidance slot 303 of the left jaw member 300, the right guidance slot 403 of the right jaw member 400, the base guidance slot 203 of the base member 200, the intermediate guidance slot 601 of the intermediate member 600, and the top guidance slot 701 of the top member 700. Because the left jaw member 300 is interlocked to the right jaw member 400 by the guide bolt 710 running through the left guidance slot 303 and right guidance slot 403, the motion of the left jaw member 300 is synchronized with that of the right jaw member 400. Therefore, when the bumper member 800 causes the trigger arm member 500 to release the left jaw member 300, both the left jaw member 300 and right jaw member 400 will close simultaneously, allowing the underwater vehicle to securely grasp the target. As the left jaw member 300 and right jaw member 400 close, the left jaw member 300 pivots about the left pivot hole 305 and the right jaw member 400 pivots about the right pivot hole 405, as depicted in FIG. 13. The left jaw member 300 may be secured to the base member 200 by means of a bolt running through the left pivot hole 305 and the left base fastening hole 205 (see FIG. 2), and the right jaw member 400 may be secured to the base member 200 by means of a bolt running through the right pivot hole 405 and the right base fastening hole 206 (see FIG. 2) in such a way that the left jaw member 300 and the right jaw member 400 may still pivot.

We claim:

1. A device for docking unmanned underwater vehicles comprising:
   a base member comprising a vertical fin member, wherein the vertical fin member further comprises a vertical fin stopper surface, wherein the base member has a base guidance slot formed therethrough, wherein the vertical fin member has a trigger arm recess formed thereon;
   a left jaw member comprising a left jaw portion and a left lever portion, wherein the left lever portion has a left guidance slot formed therethrough, wherein the left jaw member is pivotally connected to the base member, wherein the left jaw member has a left fastening hole formed therethrough, wherein a trigger release screw is received in the left fastening hole;
   a right jaw member comprising a right jaw portion and a right lever portion, wherein the right lever portion has a right guidance slot formed therethrough, wherein the right jaw member is pivotally connected to the base member;
   a trigger arm member comprising a trigger hook portion and a curved trigger arm end, wherein the trigger arm member has a trigger arm actuation hole formed therethrough, wherein the trigger hook portion is connected to the trigger release screw;
   a top member having a top guidance slot formed therethrough, a left spring hole formed therethrough, a right spring hole formed therethrough, a left bottom recessed formed thereon, a right bottom recess formed thereon, a left spring recess formed thereon, a right spring recess formed thereon;
   a guide bolt is received through the top guidance slot;
   a left spring tension screw received through the left spring hole;
   a left spring spacer retained in the left spring recess;
   a bumper member comprising a front bumper surface, a left elongated member, and a right elongated member, wherein the left elongated member is slidably received in the left bottom recess; and
   wherein the bumper member further comprises a rear bumper surface, wherein the left spring abuts the rear bumper surface, and wherein the left elongated member abuts the trigger actuation screw.

2. The device of claim 1, wherein the base member has a base spring recess formed thereon, wherein the base member has a left base fastening hole formed therethrough, and wherein the base member has a right base fastening hole formed therethrough.

3. The device of claim 1, wherein the left jaw portion has a left locking projection, wherein the left jaw member has a left pivot hole formed therethrough, and wherein the left jaw member has a left spring slot formed thereon.

4. The device of claim 1, wherein the right jaw portion has a right locking projection, wherein the right jaw member has a right pivot hole formed therethrough, and wherein the right jaw member has a right spring slot formed thereon.

5. The device of claim 1, wherein the curved trigger arm end is received in the trigger arm recess.

6. The device of claim 1, further comprising an intermediate member with an intermediate guidance slot formed therethrough, a left intermediate fastening hole formed therethrough, and a right intermediate fastening hole formed therethrough.

7. The device of claim 6, wherein the intermediate member is pivotally connected to the left jaw member, and wherein the intermediate member is further pivotally connected to the right jaw member.

8. The device of claim 6, wherein the guide bolt is further received through the intermediate guidance slot.

9. The device of claim 1, wherein the top member has a left top fastening hole formed therethrough, and wherein the top member has a right top fastening hole formed therethrough.

10. The device of claim 1, wherein the bumper member has a left bumper spring hole formed therethrough, and where the bumper member has a right bumper spring hole formed therethrough.

11. The device of claim 1, wherein the right elongated member is slidably received in the right bottom recess.

12. A device for docking unmanned underwater vehicles comprising:
- a base member comprising a vertical fin member, wherein the vertical fin member further comprises a vertical fin stopper surface, wherein the base member has a base guidance slot formed therethrough, wherein the vertical fin member has a trigger arm recess formed thereon;
- a left jaw member comprising a left jaw portion and a left lever portion, wherein the left lever portion has a left guidance slot formed therethrough, wherein the left jaw member is pivotally connected to the base member, wherein the left jaw member has a left fastening hole formed therethrough, wherein a trigger release screw is received in the left fastening hole;
- a right jaw member comprising a right jaw portion and a right lever portion, wherein the right lever portion has a right guidance slot formed therethrough, wherein the right jaw member is pivotally connected to the base member;
- a trigger arm member comprising a trigger hook portion and a curved trigger arm end, wherein the trigger arm member has a trigger arm actuation hole formed therethrough, wherein the trigger hook portion is connected to the trigger release screw;
- an intermediate member with an intermediate guidance slot formed therethrough, a left intermediate fastening hole formed therethrough, and a right intermediate fastening hole formed therethrough;
- a top member having a top guidance slot formed therethrough, a left spring hole formed therethrough, a right spring hole formed therethrough, a left bottom recessed formed thereon, a right bottom recess formed thereon, a left spring recess formed thereon, a right spring recess formed thereon;
- a guide bolt is received through the top guidance slot;
- a left spring tension screw received through the left spring hole;
- a left spring spacer retained in the left spring recess;
- a bumper member comprising a front bumper surface, a left elongated member, and a right elongated member, wherein the left elongated member is slidably received in the left bottom recess; and
- wherein the bumper member further comprises a rear bumper surface, wherein the left spring abuts the rear bumper surface, and wherein the left elongated member abuts the trigger actuation screw.

13. The device of claim 12, wherein the base member has a base spring recess formed thereon, wherein the base member has a left base fastening hole formed therethrough, and wherein the base member has a right base fastening hole formed therethrough.

14. The device of claim 12, wherein the left jaw portion has a left locking projection, wherein the left jaw member has a left pivot hole formed therethrough, and wherein the left jaw member has a left spring slot formed thereon.

15. The device of claim 12, wherein the right jaw portion has a right locking projection, wherein the right jaw member has a right pivot hole formed therethrough, and wherein the right jaw member has a right spring slot formed thereon.

16. The device of claim 12, wherein the curved trigger arm end is received in the trigger arm recess.

17. The device of claim 12, wherein the intermediate member is pivotally connected to the left jaw member, wherein the intermediate member is further pivotally connected to the right jaw member, wherein the top member has a left top fastening hole formed therethrough, wherein the top member has a right top fastening hole formed therethrough, and wherein the guide bolt is further received through the intermediate guidance slot.

18. The device of claim 12, wherein the bumper member has a left bumper spring hole formed therethrough, and where the bumper member has a right bumper spring hole formed therethrough.

19. The device of claim 12, wherein the right elongated member is slidably received in the right bottom recess.

20. A device for docking unmanned underwater vehicles comprising:
- a base member comprising a vertical fin member,
  - wherein the vertical fin member further comprises a vertical fin stopper surface;
  - wherein the base member has a base guidance slot formed therethrough;
  - wherein the base member has a base spring recess formed thereon;
  - wherein the base member has a left base fastening hole formed therethrough;
  - wherein the base member has a right base fastening hole formed therethrough;
  - wherein the vertical fin member has a trigger arm recess formed thereon;
- a left jaw member comprising a left jaw portion and a left lever portion,
  - wherein the left lever portion has a left guidance slot formed therethrough;
  - wherein the left jaw member is pivotally connected to the base member;
  - wherein the left jaw member has a left fastening hole formed;
  - wherein the left jaw member has a trigger release screw received in the left fastening hole;
  - wherein the left jaw portion has a left locking projection;
  - wherein the left jaw member has a left pivot hole formed therethrough;
  - wherein the left jaw member has a left spring slot formed thereon;
- a right jaw member comprising a right jaw portion and a right lever portion,
  - wherein the right lever portion has a right guidance slot formed therethrough;
  - wherein the right jaw member is pivotally connected to the base member;
  - wherein the right jaw portion has a right locking projection;
  - wherein the right jaw member has a right pivot hole formed therethrough;
  - wherein the right jaw member has a right spring slot formed thereon;
- a trigger arm member comprising a trigger hook portion and a curved trigger arm end,
  - wherein the trigger hook portion is connected to the trigger release screw;
  - wherein the curved trigger arm end is received in the trigger arm recess;
- an intermediate member with an intermediate guidance slot formed therethrough;
  - wherein the intermediate member has a left intermediate guidance hole formed therethrough;
  - wherein the intermediate member has a right intermediate guidance hole formed therethrough;
  - wherein the intermediate member is pivotally connected to the left jaw member;
  - wherein the intermediate member is pivotally connected to the right jaw member;

a top member having a top guidance slot formed therethrough,
  wherein the top member has a left spring hole formed therethrough;
  wherein the top member has a right spring hole formed therethrough;
  wherein the top member has a right spring hole formed thereon;
  wherein the top member has a left bottom recess formed thereon;
  wherein the top member has a right bottom recess formed thereon;
  wherein the top member has a left spring recess formed thereon;
  where the top member has a right spring recess formed thereon;
  wherein the top member has a left top fastening hole formed therethrough;
  wherein the top member has a right top fastening hole formed therethrough;
a guide bolt is received through the top guidance slot, left guidance slot, right guidance slot, and intermediate guidance slot;
a left spring tension screw received through the left spring hole, a left spring spacer retained in the left spring recess, a left spring retained in the left spring recess;
a bumper member comprising a front bumper surface, a left elongated member, and a right elongated member,
  wherein the bumper member has a left bumper spring hole formed therethrough;
  wherein the bumper member has a right bumper spring hole formed therethrough;
  wherein the left elongated member is slidably received in the left bottom recess;
  wherein the right elongated member is slidably received in the right bottom recess;
  wherein the bumper member further comprises a rear bumper surface;
  wherein the left spring abuts the rear bumper surface; and
  wherein the left elongated member abuts the trigger actuation screw.

\* \* \* \* \*